United States Patent Office 3,562,204
Patented Feb. 9, 1971

3,562,204
THERMOPLASTIC ELASTOMERIC COMPOSITION COMPRISING BLOCK COPOLYMERS AND RANDOM COPOLYMERS
Adriaan W. van Breen, Delft, Netherlands, assignor to Shell Oil Company, New York, N.Y., a corporation of Delaware
No Drawing. Filed Dec. 22, 1966, Ser. No. 603,723
Claims priority, application Netherlands, Feb. 11, 1966, 6601741
Int. Cl. C08f *19/08, 33/08*
U.S. Cl. 260—41.5          6 Claims

ABSTRACT OF THE DISCLOSURE

New compositions having increased hardness and stiffness comprise 100 parts by weight of block copolymers of monovinyl arenes and conjugated dienes, and 2–200 parts by weight of random copolymers of the same monomer types containing 50–90% condensed monovinyl arene content.

---

The invention relates to a process for the preparation of a thermoplastic composition containing an elastomeric block copolymer. The elastomeric block copolymers in question possess three polymer blocks, viz terminal polymer blocks of a vinyl aromatic hydrocarbon and a central polymer block of a conjugated diene hydrocarbon. They have the special property of possessing the properties of a vulcanized rubber without having been vulcanized. As is known, conventional rubbers have to be vulcanized in order to obtain useful elastomeric properties. This necessitates an extra processing treatment and, moreover, also has other drawbacks. When rubber articles are being molded the losses of vulcanized rubber are often found to be considerable. The waste material resulting from such operations is not satisfactory for use in further molding operations, since, being vulcanized rubber, it is no longer thermoplastic. The waste is therefore mainly used as filler or reclaiming agent for new rubber compositions. The elastomeric block copolymers, which constitute a component of the compositions according to the present invention, do not display this drawback, since they do not need to be vulcanized and thus can be treated and recycled as thermoplastic materials.

The block copolymers therefore can be used advantageously in a large number of diverse applications. In this context it may be desired to process the block copolymers to given compositions having properties which satisfy certain requirements inheernt in the application envisaged. For example, in a composition destined for processing to a rubber sole for a shoe, demands must be met in respect of hardness and stiffness, while on the other hand the typical rubber properties such as a high elongation and flexibility and a low set must be retained. It has now been found that an improved composition comprises the combination of the block copolymer and a copolymer having a random distribution of the monomers in the polymer chain ("random" copolymer) of a vinyl aromatic hydrocarbon and a conjugated diene containing more than 50% by weight of vinyl aromatic hydrocarbon. For the sake of brevity a copolymer of this type will be called a "non-segmented" copolymer in the present specification and claims.

The invention also relates to a process for the preparation of a thermoplastic composition containing an elastomeric block copolymer, in which a composition is compounded which contains a block copolymer having the general formula:

A—B—A in which A is an independently selected polymer block of a monovinyl aromatic hydrocarbon and B is a polymer block of a conjugated diene hydrocarbon and 2 to 200 parts by weight—based on 100 parts by weight of the said block copolymer—of a non-segmented (random) copolymer of a monovinyl aromatic hydrocarbon and a conjugated diene containing more than 50% by weight of monovinyl aromatic hydrocarbon.

By means of mixing with the above-mentioned non-segmented block copolymer, block copolymer compositions are obtained which display a striking increase in the stiffness and hardness compared with the unextended block copolymers. The block copolymres preferably used as components in the present compositions satisfy the general formula A—B—A, in which the polymer blocks A have an average molecular weight of between 5,000 and 100,000, and the polymer block B has an average molecular weight of between 25,000 and 1,000,000. The characteristic property of this class of block copolymers is that they are "self-vulcanizing," in other words they possess the strength properties of a vulcanized rubber without having been vulcanized.

Of this class of block copolymers particular preference is given to the block copolymers A—B—A, in which the polymer blocks A have an average molecular weight of between 10,000 and 50,000 and the polymer block B has an average molecular weight of between 30,000 and 200,000, the polymer blocks A forming 23% to 55% by weight of the total block copolymer. Optimally, the polymer block B has an average molecular weight of between 40,000 and 150,000. The average molecular weights are determined from the intrinsic viscosity, osmotic measurements or from labelling with radioactive isotopes, all methods which give reasonably corresponding results.

As has already been stated, A is an independently selected polymer block of a monovinyl aromatic hydrocarbon, preferably styrene. Homologues of styrene can also be used as monomeric component, such as for example ring-alkylated styrene, for instance $\alpha$-methyl styrene. The central block B is a polymer block from a conjugated diene. This diene preferably contains 4 to 5 carbon atoms per molecule, butadiene being particularly preferable as monomeric component.

The block copolymers can be prepared by sequential formation of the polymer blocks by means of polymerization of the relevant monomer in the presence of a lithium-based catalyst in a hydrocarbon solvent. In this way a polystyrene-polybutadiene-polystyrene block copolymer can be obtained by polymerizing styrene in the presence of butyl lithium as initiator to an initial polystyrene-lithium polymer block. Butadiene is added to the resultant solution of this "living" polymer block and the polymerization is continued until an intermediate polystyrene-polybutadiene-lithium block copolymer is formed. The desired polystyrene-polybutadiene-polystyrene is finally obtained by the addition of styrene and continued polymerization.

Using a coupling process or with the aid of a bifunctional initiator a three-block copolymer of the above type can be prepared by means of a two-stage polymerization. In the case of a coupling process a desired terminal block A is first formed, as described above, the conjugated diene being subsequently polymerized, but now to half the molecular weight desired for the final polymer. In this way the intermediate "living" block copolymer A½B Li is formed. This is now coupled to itself with the use of a suitable coupling agent, such as divinyl benzene or a dihaloalkane, to form the desired block copolymer A—B—A. If use is made of a bifunctional initiator, such as dilithium naphthalene, the central block is first formed by polymerization of a conjugated diene to form a polymer block Li—B—Li, "living" at both ends; a vinyl aromatic hydrocarbon is then added and the block copolymer A—B—A is again formed by means of continued polymerization.

Another component of the compositions according to the present invention is a copolymer which, in contrast to the block copolymer or segmented copolymer A—B—A, is a non-segmented (or random) copolymer of a vinyl aromatic hydrocarbon and a conjugated diene. As has been stated, the copolymer in question contain at least 50% by weight of vinyl aromatic hydrocarbon. There is a very pronounced improvement in the resultant composition if a non-segmented copolymer having a condensed monovinyl aromatic hydrocarbon content of between 70 and 90% by weight, preferably between 80 and 90% by weight is used as component. The non-segmented copolymer is preferably a copolymer of styrene and butadiene.

The compounding of the composition can be carried out using the conventional mixing devices for polymers, such as mixing mills, Banbury mixers or extruders. A hydrocarbon solution of the block copolymer can also be mixed with the non-segmented copolymer, whereupon the resultant solution is coagulated. A suitable coagulation method consists in bringing the solution into contact with an aqueous medium at elevated temperature, such as steam for example, so that the hydrocarbon solvent evaporates and a mixture of the block copolymer and the non-segmented copolymer is separated off. A preferable composition to be compounded contains 15–100 parts by weight of the non-segmented copolymer per 100 parts by weight of block copolymer, while for certain applications, such as for shoe soles, optimum results are obtained by including in the composition 35 to 45 parts by weight of the non-segmented copolymer per 100 parts by weight of block copolymer.

The compositions according to the invention can contain the additives conventionally used for rubber, such as fillers and extender oils. It has been found that when use is made of silica fillers, there is a striking improvement in the stiffness and hardness of the composition thus prepared.

The present compositions are suitable as starting materials for a variety of molding processes, amongst which the production of parts for shoes, in particular shoe soles, is of special importance in view of the high requirements in respect of hardness and stiffness which the compositions satisfy.

EXAMPLE I

Compositions on the basis of a block copolymer having a polystyrene-polybutadiene-polystyrene structure, and having block molecular weights of 14,000–44,000–14,000 respectively, prepared by means of sequential polymerization of the corresponding monomers with lithium butyl in a hydrocarbon solution, were compounded on a two-roll rubber mixing mill at 150° C. From the resultant mixtures test slabs were obtained by molding under pressure at 170° C. for ten minutes, followed by cooling under pressure, in accordance with the standard practice employed in the testing of thermoplastic materials. The composition and the properties of the compositions obtained are shown in the following table. The figures refer to parts by weight.

TABLE I

| Component | 1 | 2 | 3 | 4 | 5 |
|---|---|---|---|---|---|
| Block copolymer | 100 | 100 | 100 | 100 | 100 |
| Polystyrene | | 5 | | 40 | |
| Styrene-butadiene random copolymer [1] | | | 5 | | 40 |
| Aromatic extender oil | | | | 40 | 40 |
| HAF-black | | | | 50 | 50 |
| Properties: | | | | | |
| Hardness, Shore A | 75 | 75 | 81 | 75 | 86 |
| Stiffness in flexure [2] | 250 | 300 | 550 | 100 | 340 |

[1] 85% by weight of styrene.
[2] Kg./cm.², ASTM D747–58T.

If composition 1 is compared with composition 3 it can be seen that a striking improvement, viz almost twice the stiffness and a pronounced increase in the hardness is obtained with the use of only 5 parts of a non-segmented copolymer containing 85% by weight of styrene. If compositions 2 and 3 are compared the improvement with the relevant copolymer of styrene and butadiene is shown to be more considerable than that obtained with polystyrene.

EXAMPLE II

In the manner described in Example I a number of compositions based on the same polystyrene-polybutadiene-polystyrene block copolymer were compounded and their properties tested. (The figures are parts by weight.)

TABLE II

| Component | 1 | 2 | 3 | 4 | 5 |
|---|---|---|---|---|---|
| Block copolymer | | | 100 | | |
| Aromatic extending oil | | | 40 | | |
| Silica filler | | | 50 | | |
| Styrene-butadiene random copolymer [1] | 20 | 40 | 60 | 80 | |
| Properties: | | | | | |
| Tensile strength, kg./cm.² | 55 | 55 | 60 | 65 | 65 |
| Elongation at break, percent | 690 | 620 | 530 | 500 | 420 |
| Modulus 300%, kg./cm.² | 33 | 39 | 50 | 53 | 59 |
| Hardness, Shore A | 69 | 77 | 88 | 91 | 94 |
| Stiffness in flexure, kg./cm.² | 70 | 250 | 480 | 580 | 960 |
| Set at break percent | 33 | 53 | 70 | 91 | 89 |
| Density grams/cm.³ | 1.09 | 1.09 | 1.08 | 1.08 | 1.07 |

[1] 85% styrene.

This table shows that optimum results are obtained with approximately 40 parts by weight of styrene-butadiene copolymer per 100 parts by weight of block copolymer. In quantities of this order the hardness and the stiffness reach high values, while the typical rubber properties, viz a high elongation at break and a low set are retained.

EXAMPLE III

In order to examine the influence of the styrene content of the styrene-butadiene copolymer added on the properties of the compositions obtained therewith, the mixtures shown in Table III were studied. These mixtures were again compounded in the manner described in Example I. As block copolymer use was made of a polystyrene-polybutadiene-polystyrene having block molecular weights of 10,000–43,000–13,000 respectively, prepared by sequential polymerization of styrene, butadiene and styrene in the presence of lithium butyl in a hydrocarbon solvent.

TABLE III

| | 1 | 2 | 3 | 4 | 5 | 6 | 7 | 8 | 9 | 10 |
|---|---|---|---|---|---|---|---|---|---|---|
| Formulation: | | | | | | | | | | |
| Block copolymer | 100 | 100 | 100 | 100 | 100 | 100 | 100 | 100 | 100 | 100 |
| Aromatic extender oil | 40 | 40 | 40 | 40 | 40 | 40 | 40 | 40 | 40 | 40 |
| Silica filler | 50 | 50 | 50 | 50 | 50 | | | | | |
| Ground whiting | | | | | | 50 | 50 | 50 | 50 | 50 |
| Polystyrene (S/B[1]=100/=) | 40 | | | | | 40 | | | | |
| Styrene-butadiene copolymer: | | | | | | | | | | |
| S/B=90/10 | | 40 | | | | | 40 | | | |
| S/B=85/15 | | | 40 | | | | | 40 | | |
| S/B=70/30 | | | | 40 | | | | | 40 | |
| S/B=23/77 | | | | | 40 | | | | | 40 |
| Properties: | | | | | | | | | | |
| Tensile strength, kg./cm.² | 35 | 40 | 45 | 20 | 10 | 35 | 38 | 33 | 25 | 14 |
| Elongation at break, percent | 280 | 390 | 380 | 440 | 420 | 420 | 440 | 430 | 530 | 500 |
| Modulus 300%, kg./cm.² | | 34 | 40 | 17 | 7 | 26 | 33 | 29 | 18 | 13 |
| Stiffness in flexure, kg./cm.² | 180 | 350 | 580 | 180 | 30 | 20 | 40 | 30 | 45 | 30 |
| Hardness, Shore A | 77 | 86 | 90 | 80 | 53 | 50 | 59 | 57 | 46 | 49 |
| Density, gram/cm.³ | 1.09 | 1.09 | 1.08 | 1.07 | 1.06 | 1.12 | 1.12 | 1.11 | 1.10 | 1.10 |

[1] S/B styrene/butadiene percentage by weight.

From the afore-mentioned table the following can be seen:

The results with a styrene-butadiene copolymer having a styrene content of more than 50% by weight are better than with polystyrene or with a styrene-butadiene copolymer having a relatively low styrene content, viz. 23% by weight. The best results are achieved with a styrene-butadiene copolymer having a styrene content of 85% by weight. The improvement in the properties can be seen particularly in the high values found for the stiffness and the hardness.

It is also evident that, particularly when Ultrasil VN3 is used, there is a striking improvement in the stiffness and hardness as a result of the use of the non-segmented block copolymer.

I claim as my invention:

1. Novel unvulcanized compositions of matter comprising:
  (a) 100 parts by weight of an elastomeric block copolymer having the general configuration

A—B—A wherein each A is a polymer block of a monovinyl arene and B is a polymer block of a conjugated diene, each block A having an average molecular weight between 5,000 and 100,000 and block B having an average molecular weight between about 25,000 and 1 million, the A block content comprising 23–55% by weight of the block copolymer; and
  (b) 2–200 parts by weight of a random copolymer of a conjugated diene and a monovinyl arene containing 50–90% by weight of condensed monovinyl arene.

2. A composition according to claim 1 wherein the random copolymer is a styrene-butadiene copolymer containing 70–90% by weight of condensed styrene.

3. A composition according to claim 2 wherein the block copolymer has the configuration Polystyrene—polybutadiene—polystyrene each polystyrene block having an average molecular weight between about 10,000 and 50,000 and the polybutadiene block having an average molecular weight between about 40,000 and 150,000, the total polystyrene block content being between about 23% and 35% by weight of the block copolymer; and containing about 50 parts by weight of silica filler.

4. A composition according to claim 3 containing 15–100 parts by weight of the random copolymer.

5. A composition according to claim 2 wherein the block copolymer has the configuration Polystyrene—polybutadiene—polystyrene each polystyrene block having an average molecular weight between about 10,000 and 50,000 and the polybutadiene block having an average molecular weight between about 40,000 and 150,000, the total polystyrene block content being between about 23% and 35% by weight of the block copolymer.

6. A composition according to claim 5 containing 15–100 parts by weight of the random copolymer.

References Cited

UNITED STATES PATENTS

| | | | |
|---|---|---|---|
| 2,614,093 | 10/1952 | Wheelock | 260—892 |
| 2,638,462 | 5/1953 | Borders | 260—892 |
| 3,231,635 | 1/1966 | Holden et al. | 260—876B |
| 3,352,944 | 11/1967 | Wheat | 260—876B |

OTHER REFERENCES

Railsback et al.: Rubber Age, January 1964, pp. 583–589.

SAMUEL H. BLECH, Primary Examiner

H. ROBERTS, Assistant Examiner

U.S. Cl. X.R.

260—33.6, 876, 880